(12) United States Patent
Chand et al.

(10) Patent No.: US 10,037,547 B2
(45) Date of Patent: Jul. 31, 2018

(54) GROUPING CHANNELS BASED ON USER ACTIVITY

(71) Applicants: Ashootosh Chand, Bangalore (IN); Bharathi Shekar, Bangalore (IN); Ankit Suchanti, Bangalore (IN); Yash Kotak, Bangalore (IN)

(72) Inventors: Ashootosh Chand, Bangalore (IN); Bharathi Shekar, Bangalore (IN); Ankit Suchanti, Bangalore (IN); Yash Kotak, Bangalore (IN)

(73) Assignee: RICOH CO., LTD., Tokyo (JP)

( * ) Notice: Subject to any disclaimer, the term of this patent is extended or adjusted under 35 U.S.C. 154(b) by 0 days.

(21) Appl. No.: 14/198,496

(22) Filed: Mar. 5, 2014

(65) Prior Publication Data
US 2015/0254711 A1 Sep. 10, 2015

(51) Int. Cl.
*G06Q 30/00* (2012.01)
*G06Q 30/02* (2012.01)

(52) U.S. Cl.
CPC ..... *G06Q 30/0255* (2013.01); *G06Q 30/0269* (2013.01)

(58) Field of Classification Search
CPC ................................................ G06Q 30/0255
See application file for complete search history.

(56) References Cited

U.S. PATENT DOCUMENTS

2008/0040278 A1* 2/2008 DeWitt ............................ 705/44
2010/0332324 A1* 12/2010 Khosravy et al. .......... 705/14.53
2012/0123830 A1* 5/2012 Svendsen et al. ........... 705/14.5

* cited by examiner

*Primary Examiner* — Bennett M Sigmond
*Assistant Examiner* — Scott C Anderson
(74) *Attorney, Agent, or Firm* — Patent Law Works LLP

(57) ABSTRACT

The disclosure includes a system and method for recommending an advertising campaign based on which channels are popular. A recognition application receives captured images from user devices, the captured images including information about products, identify indexed images that match the captured images, identify metadata about the captured images including information associated with products in the captured images, determine popularity of each channel based on a number of interactions that users have had with channels during a time period based on the metadata, receive an advertisement and provide on the one or more channels the advertisement based on the popularity of each channel.

20 Claims, 8 Drawing Sheets

GROUPING CHANNELS BASED ON USER ACTIVITY

BACKGROUND OF THE INVENTION

1. Field of the Invention

The specification relates to generating targeted advertisements. In particular, the specification relates to a system and method for recommending an advertising campaign based on a popularity of channels.

2. Description of the Background Art

Users consume media from a variety of sources, for example, broadcast television, streaming movies from a website, reading newspapers, looking at advertisements on a subway, etc. Services currently exist to track users' viewing habits; however, the services are limited to a single source. For example, a first website that provides streaming services can track a user's consumption of media from the first website, but the first website cannot know the user's activities on other websites. As a result, the tracking information is incomplete.

This represents a lost opportunity for advertisers. If advertisers are only aware of a user's activity on one website, they lose the opportunity to provide personalized suggestions that are more likely to result in purchases.

SUMMARY OF THE INVENTION

The disclosure includes a system and method for recommending an advertising campaign based on a popularity of channels. In one embodiment, the system is configured to receives captured images from user devices, the captured images including information about products, identify indexed images that match the captured images, identify metadata about the captured images including information associated with products in the captured images, determine popularity of each channel based on a number of interactions that users have had with channels during a time period based on the metadata, receive an advertisement and provide on the one or more channels the advertisement based on the popularity of each channel.

Other aspects include corresponding methods, systems, apparatuses and computer program products for these and other innovative aspects.

The specification advantageously describes technology for providing an advertisement to a user on a channel selected based on popularity. This provides an efficient way to estimate the success of a targeted advertisement before it is launched.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
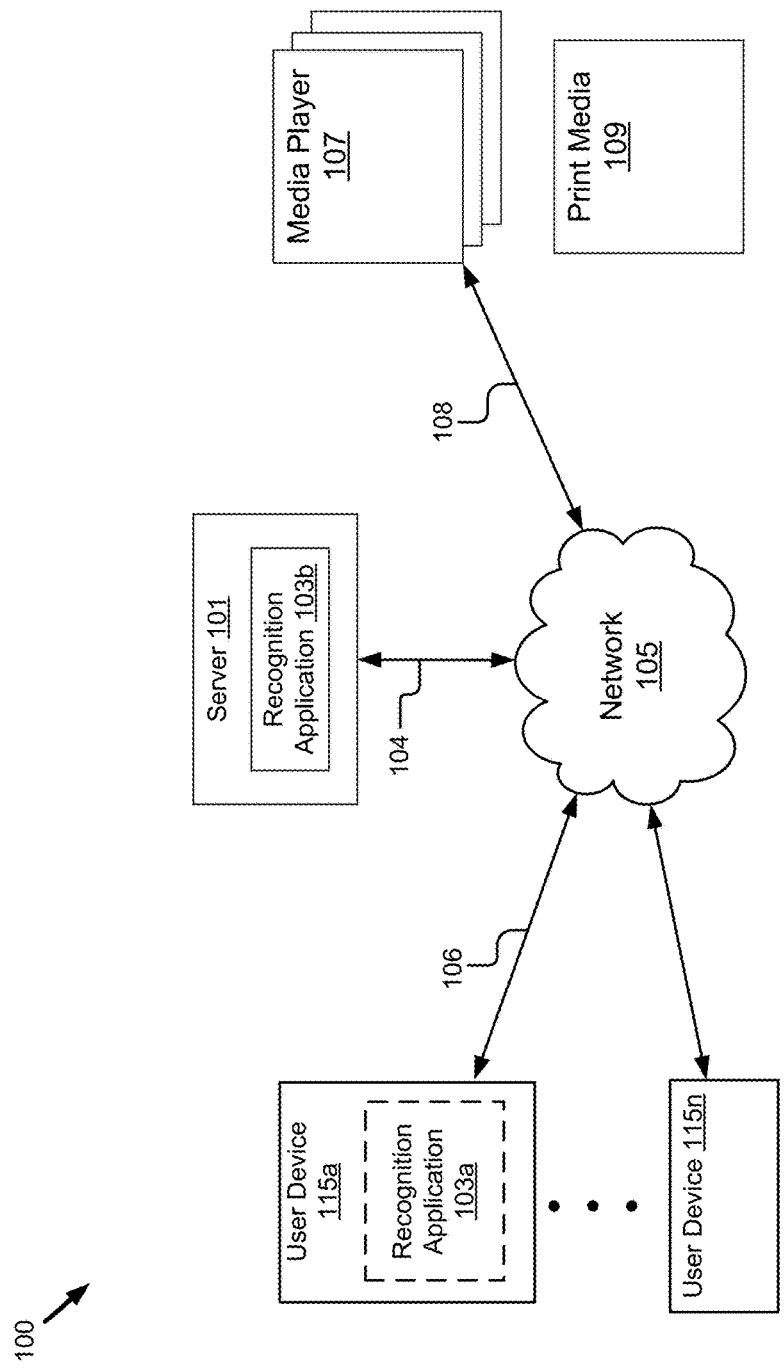
FIG. 1 is a high-level block diagram illustrating one embodiment of a system for recommending an advertising campaign based on which channels are popular.

A system and method for recommending an advertising campaign based on a popularity of channels. In the following description, for purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to user devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O processing units.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for recommending an advertising campaign based on which channels are popular. The illustrated system 100 includes a server 101, a media player 107, a print media 109 and user devices 115a . . . 115n that can be accessed by users and the server 101. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or includes portions of a telecommunications network for sending data in a variety of different communication protocols. In some embodiments, the network 105 includes Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the user device 115 and the server 101, in practice one or more networks 105 can be connected to these entities.

A user device 115a, 115n can be a computing device that includes a memory, a processor and a camera. For example, the user device 115 can be a laptop computer, a desktop computer, a tablet computer, a mobile telephone, a personal digital assistant (PDA), a mobile email device, a digital set top box (STB), digital video recorder (DVR), connected television, etc. In some embodiments, the camera is a high resolution camera. The user device 115a, 115n is connected to the network 105, for example, 115a is connected to the network 105 via signal line 106. In some embodiments, the user device 115 is adapted to send and receive data to and from the server 101 via the network 105. In other embodiments, the user device 115 also receives data from the media player 107 and the print media 109.

The media player 107 is an electronic device that displays media content. For example, the media player 107 can be a television that displays broadcast TV programs or an application server that plays streaming videos. The media player 107 coupled to the network 105 via signal line 108. In one embodiment, the media player 107 receives inputs from a user to play, pause or stop the playback of media content. In another embodiment, the user device 115a receives instructions from a user that is watching the media content played on the media player 107, captures an image from the media content and transmits the image to the server 101 for further processing.

In some embodiments, there are multiple media players 107 that each plays media content received from different sources (e.g., websites, video stores, etc.). In some examples, the media content from different sources is played on different media players 107. In other examples, the media content is received and played by the same media player 107.

The print media 109 can be a paper document reproducing text and images in ink for user consumption. For example, the print media 109 can be a news magazine, a fashion magazine, a sports magazine, a tabloid magazine, a newspaper, a journal, etc. The user device 115 receives instructions from a user, captures an image from the print media 109 and transmits the image to the server 101. For example, the captured image is an image of a newest electric car advertised in a daily newspaper or an image of a celebrity wearing a fashion jacket in a fashion magazine.

In some embodiments, the recognition application 103a is stored on a user device 115a. In one example, the recognition application 103a is a thin-client application that includes part of the recognition application 103 on the user device 115a and part of the recognition application 103 on the server 101 to recommend an advertising campaign based on which channels are popular.

In other embodiments, the recognition application 103b is operable on the server 101. The server 101 can be a computing device that includes a processor, a memory and network communication capabilities. The server 101 is coupled to the network 105 via signal line 104. The server 101 sends and receives data to and from other entities (e.g., the user device 105) of the system 100 via the network 105. Although only one server 101 is shown, persons of ordinary skill in the art will recognize that multiple servers can be present.

In one embodiment, the recognition application 103 can be implemented using hardware including a field-programmable gate array (FPGA) or an application-specific integrated circuit (ASIC). In another embodiment, the recognition application 103 can be implemented using a combination of hardware and software.

In one embodiment, the recognition application 103 receives a captured image from the user device 115. The captured image is from media. For example, the captured image is a screen shot of a show about single women living in New York City. The recognition application 103 identifies metadata associated with the captured image. For example, the recognition application 103 determines the time when the image was captured and the location of the user. The recognition application 103 generates a user profile for the user based on user demographics and the metadata. For example, the user profile includes that the user is 23, lives in San Francisco, and captured an image in San Francisco at 6:00 pm.

The recognition application 103 identifies an indexed image that matches the captured image. Once the indexed image is identified, the recognition application 103 identifies a product in the indexed image and the category associated with the product, and generates and provides the user with information about the product. For example, the information includes the captured image with an overlay of hotspots on the image that include links to websites where the user could purchase the product depicted in the image. The recognition application 103 then updates the user profile based on how the user interacts with the product. For example, the user could click on one of the hotspots, view the website with the product and make a purchase. The recognition application 103 annotates the captured image with this purchase information in the user profile.

In another embodiment, the recognition application 103 generates user profiles for each user. The user profile is used to associate users with images and to later track the user's reaction to information about products, such as when the user purchases a product that was in a captured image. The user profile also includes user demographics that can be used in conjunction with the history of captured images to recommend content. The recognition application 103 receives captured images from user devices. The images can be from print media (e.g., an image from a newspaper) or from videos (e.g., a frame from a television show). The recognition application 103 identifies metadata and users associated with the captured images. The recognition application 103 also identifies an indexed image that matches each captured image. For example, the recognition application 103 identifies that that one of the captured images is from a specific time point in a television show that airs on a channel and identifies a matched image from a database based on the specific time point.

The recognition application 103 identifies a product, a product category and a channel for each indexed image. For example, the recognition application 103 identifies that the indexed image includes a dress from a first manufacturer, a necklace from a second manufacturer and a purse from a third manufacturer. The recognition application 103 determines that the category for the dress is clothing, the category for the necklace is jewelry and the category for the purse is accessories. The recognition application 103 generates a user interface for providing information about captured images to the users. For example, in the example above, the recognition application 103 generates hotspots for each of the products that include links for how to purchase the products. The recognition application 103 also determines actions performed by the users in response to receiving the information. For example, the recognition application 103 tracks whether the user clicks on one of the links and makes a purchase.

The recognition application 103 identifies products and product categories from images and indexes the images based on the products and product categories. In one embodiment, the recognition application 103 determines which channels are popular based on a number of captured images provided from user devices 115 over a period of time. In other embodiments, the recognition application 103 determines which channels are popular based on a number of captured images relating to a particular product, a particular brand, a group of products or product categories provided from user devices 115 over a period of time. In other embodiments, the recognition application 103 determines which channels are popular based on a number of captured images relating to a particular product, a particular brand, a group of products or product categories provided from user devices 115 at a particular time. In other embodiments, the recognition application 103 determines which channels are popular based on actions performed by users, such as a number of purchases resulting from capturing images for all products, a number of purchases resulting from capturing images for a particular product or a number of purchases resulting from capturing images for a product category. The recognition application 103 recommends at least one advertisement based on which channels are popular. For example, if images of a product are captured during certain peak times or purchases are made during peak times, the recognition application 103 recommends broadcasting an advertising campaign for the product at that time period. In some embodiments, the recognition application 103 generates a user profile based on user demographics and metadata associated with the captured image including the product, updates the user profile based on how the user interacts with the product and recommends an advertisement based on the user profile.

The recognition application 103 receives an advertising campaign associated with an indexed image, the advertising campaign including a set of advertisements, identifies a product associated with each advertisement, determines a popularity of each channel based on receiving captured images from user devices, receives a captured image from a user device, the captured image including information about a product, identifies that the indexed image matches the captured image and the information about the product in the image, identifies an advertisement from the set of advertisements based on the information about the product and the popularity of each channel and provides the user with the advertisement on the identified channel. In some embodiments, the recognition application 103 determines a product to be associated with the channel and the advertisement is selected for the product. The recognition application 103 is described below in more detail with reference to FIG. 2.

Recognition Application

Figure 2:
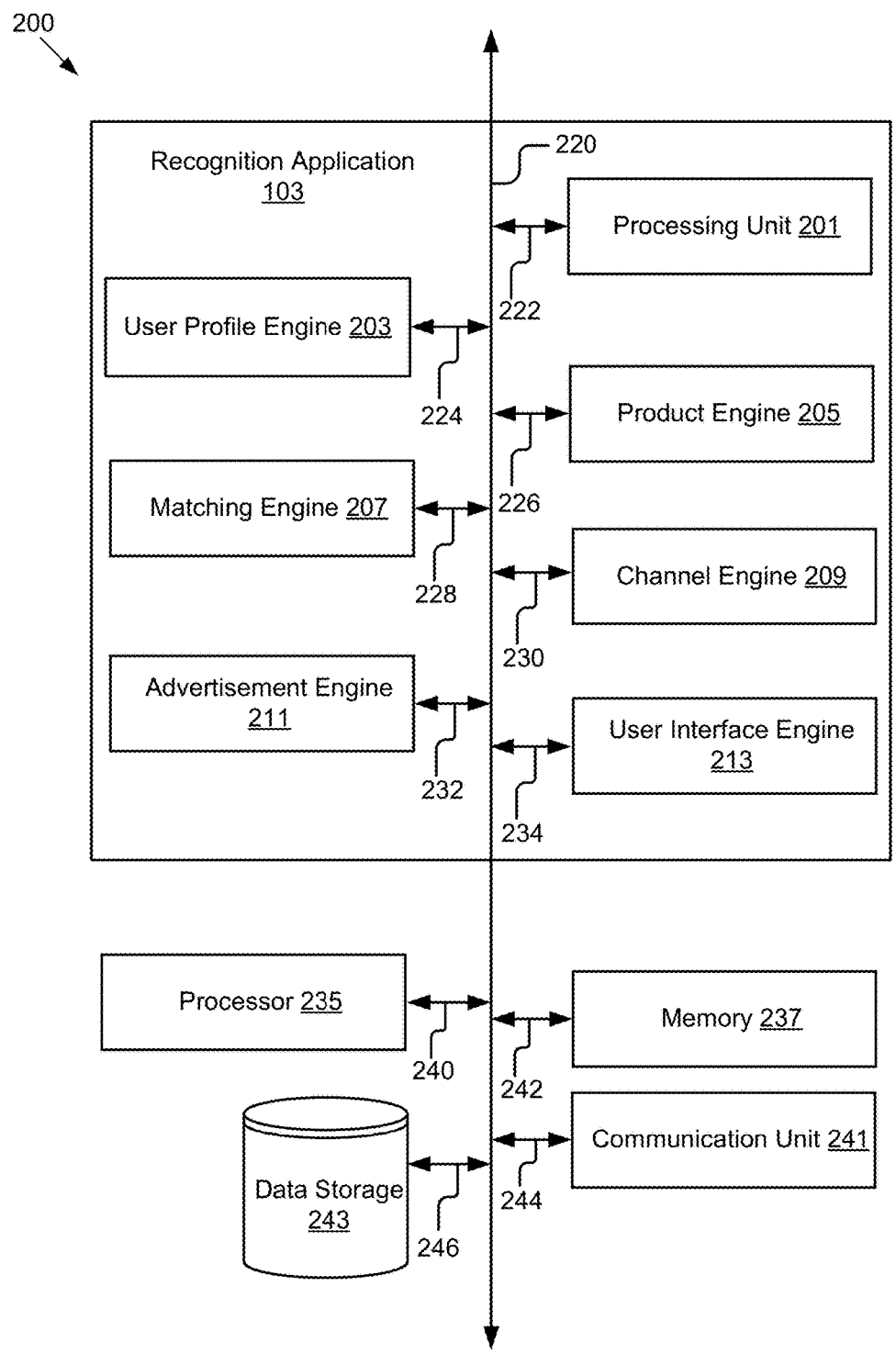
FIG. 2 is a block diagram illustrating one embodiment of a recognition application.

Referring now to FIG. 2, an example of the recognition application 103 is shown in more detail. FIG. 2 is a block diagram of a computer device 200 that includes a recognition application 103, a processor 235, a memory 237, a communication unit 241 and data storage 243 according to some examples. In one embodiment, the computing device 200 is a server 101. In another embodiment, the computing device 200 is a user device 115a. The components of the computing device 200 are communicatively coupled by a bus 220. The bus 220 may represent one or more buses including an industry standard architecture (ISA) bus, a peripheral component interconnect (PCI) bus, a universal serial bus (USB), or some other bus known in the art to provide similar functionality.

The processor 235 includes an arithmetic logic unit, a microprocessor, a general purpose processing unit or some other processor array to perform computations and to optionally provide electronic display signals to a display device. The processor 235 is coupled to the bus 220 for communication with the other components via signal line 240. The processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that can be executed by the processor 235. The memory 237 is coupled to the bus 220 for communication with the other components via signal line 242. The instructions and/or data may include code for performing the techniques described herein. The memory 237 may be a dynamic random access memory (DRAM) device, a static random access memory (SRAM) device, flash memory or some other memory device known in the art. In some embodiments, the memory 237 also includes a non-volatile memory or similar permanent storage device and media including a hard disk drive, a CD-ROM device, a DVD-ROM device, a DVD-RAM device, a DVD-RW device, a flash memory device, or some other mass storage device for storing information on a more permanent basis.

The communication unit 241 is hardware for receiving and transmitting data by linking the processor 235 to the network 105 and other processing systems. The communication unit 241 receives data such as an image from the user device 115 and transmits the data to the processing unit 201. The communication unit 241 also transmits data including a recommended advertisement to the user device 115. The communication unit 241 is coupled to the bus 220 via signal line 244. In one embodiment, the communication unit 241 includes a port for direct physical connection to the user device 115 or to another communication channel. For example, the communication unit 241 includes an RJ45 port or similar port for wired communication with the user device 115. In another embodiment, the communication unit 241 includes a wireless transceiver (not shown) for exchanging data with the user device 115 or any other communication channel using one or more wireless communication methods, such as IEEE 802.11, IEEE 802.16, Bluetooth® or another suitable wireless communication method.

In yet another embodiment, the communication unit 241 includes a cellular communications transceiver for sending and receiving data over a cellular communications network such as via short messaging service (SMS), multimedia messaging service (MMS), hypertext transfer protocol (HTTP), direct data connection, wireless application protocol (WAP), e-mail or another suitable type of electronic communication. In still another embodiment, the communication unit 241 includes a wired port and a wireless transceiver. The communication unit 241 also provides other conventional connections to the network 105 for distribution of files and/or media objects using standard network protocols such as TCP/IP, HTTP, HTTPS and SMTP as will be understood to those skilled in the art.

The data storage 243 is a non-transitory memory that stores data for providing the functionality described herein. The data storage 243 may be a dynamic random access memory (DRAM) device, a static random access memory (SRAM) device, flash memory or some other memory devices. In some embodiments, the data storage 243 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. In the illustrated embodiment, the data storage 243 is communicatively coupled to the bus 220 via signal line 246.

In one embodiment, the data storage 243 includes a database. The database indexes images. In one embodiment, the images are from a video played on the media player 107. The video includes a number of frames at a frame rate. Each frame represents an image of the video. For example, in a 10-minute conversation show that includes 900 frames/images and a 10-minute short movie that includes 1500 frames/images (e.g., the conversation show has a lower frame rate than the short movie), the database indexes the 900 images and 1500 images, respectively. In another embodiment, the images are from the print media 109. In one embodiment, each frame of a video is indexed. In another embodiment, unique frames of a video are indexed. For example, the database indexes images when there is a threshold difference between frames, such as a video of a person walking as opposed to a five second still shot of an object. Persons of ordinary skill in the art will recognize that many different types of indexing techniques are possible.

In one embodiment, the database indexes images using, for example, at least one of a source identifier (ID), an image ID and an indication of the image position in the source. The source of an image can be a video played on the media player 107 or a document shown in the print media 109. The source ID can represent a name of a movie, a publication date and a name of a newspaper, etc. The image ID can be a title of the image such as "C in shinning blue," "a smiling monkey," etc. The indication of the image position in the source can be an ordinal number, for example, the first image on page two of a sports magazine, the second image in a video, etc. In one embodiment, the image position in a video is indicated by a timestamp of the image in the video, for example, an image is from 0:40:25 of the video. In another embodiment, the image position in a document is indicated by x-y coordinates, for example, an image has four coordinates that each corresponds to a corner of the image in the document.

The database can index products in the images. In one embodiment, the database indexes the products as being associated with the image. For example, the database indexes a mountain bike and a bottle of juice shown in an image. In another embodiment, the database indexes a location of the product within the image. For example, the database indexes an area surrounding an image of a woman's neck as being associated with a necklace. The database also indexes products in the images according to product categories. For example, in the above example, the database indexes the mountain bike in a "bike" category and indexes the bottle of juice in a "drink" category. In yet another embodiment, the database also indexes an image based on image features (e.g., texture, edges, background colors, face features, etc.). Those skilled in the art will recognize that other features extracted from an image can be used to index the image.

The database stores indices associated with the images, and retrieves the indices in response to receiving a query. In one embodiment, the database additionally stores metadata associated with the images, for example, an image size, a video size, a document size, a resolution, a color style (e.g., black-white, colored), a time when the image was captured, etc.

In one embodiment, the recognition application 103 comprises a processing unit 201, a user profile engine 203, a product engine 205, a matching engine 207, a channel engine 209, an advertisement engine 211 and a user interface engine 213. The components of the recognition application 103 are communicatively coupled via the bus 220.

The processing unit 201 can be software including routines for handling communications between the recognition application 103 and other components of the computing device 200. In one embodiment, the processing unit 201 can be a set of instructions executable by the processor 235 to provide the functionality described below for handling communications between the recognition application 103 and other components of the computing device 200. In another embodiment, the processing unit 201 can be stored in the memory 237 of the computing device 200 and can be accessible and executable by the processor 235. In either embodiment, the processing unit 201 can be adapted for cooperation and communication with the processor 235 and other components of the computing device 200 via signal line 222.

In one embodiment, the processing unit 201 receives an image from a user device via the communication unit 241 and processes the image. In one embodiment, the image is from print media such as newspapers, magazines, articles, etc. In another embodiment, the image is from a video. For example, the processing unit 201 receives an image captured by a user using the user device 115 in the middle of watching a video played on the media player 107. The image is a screen shot from a situation comedy.

The processing unit 201 identifies metadata associated with the captured image. For example, the processing unit 201 determines the time that the image was captured and the location of the user who captured the image. The processing unit 201 identifies a source of the captured image, for example, from a newspaper or from a video. In one embodiment, the processing unit 201 identifies that a source of the image is a video and determines a timestamp associated with the image in the video. For example, the processing unit 201 identifies that the image is from a conversation show and determines that the image is at 00:05:12 of the show. In one embodiment, the processing unit 201 stores images and associated metadata in a database included in the data storage 243. The database indexes the images.

In another embodiment, the processing unit 201 also sends data to a user device via the communication unit 241. For example, the processing unit 201 receives graphical data for providing a user interface to a user from the user interface engine 213 and sends the graphical data to the user device 115 to cause the user interface displayed on the user device 115.

In yet another embodiment, the processing unit 201 transmits data from and to other components of the recognition application 103. For example, the processing unit 201 receives product information associated with an image from the product engine 205 and stores the product information in the database included in the data storage 243. In another example, the processing unit 201 retrieves indexed images from the database and sends the indexed images to the matching engine 207.

The user profile engine 203 can be software including routines for generating and updating a user profile for a user. In one embodiment, the user profile engine 203 can be a set of instructions executable by the processor 235 to provide the functionality described below for generating and updating a user profile for a user. In another embodiment, the user profile engine 203 can be stored in the memory 237 of the computing device 200 and can be accessible and executable by the processor 235. In either embodiment, the user profile engine 203 can be adapted for cooperation and communication with the processor 235 and other components of the computing device 200 via signal line 224.

The user profile engine 203 generates a user profile that includes basic information of a user, for example, a name (e.g., real life name, username, unique identifier, nickname, etc.), a photo, user demographics (e.g., age, sex, residence, language, etc.), user interests, etc. The user profile engine 203 determines the user interests based on user input (e.g., topics that the user is interested in, websites that the user subscribes to, etc.), social interactions (e.g., comments, posts or shares on a topic, electronic messages about a topic, browsing history, etc.) and other factors (e.g., types of images captured by the user). The user profile engine 203 also receives metadata associated with an image and generates the user profile for the user based on the metadata. For example, the user profile includes that the user captured an image in Salt Lake City at 6:20 pm. In one embodiment, the user profile engine 203 identifies the user who captured the image based on the identity of the user device 115, the location of the user and the time that the image was captured from metadata associated with the image stored in the user profiles.

The user profile engine 203 updates user profiles based on user activities. In one embodiment, the user profile engine 203 uses the user profiles to associate users with images and to later track the users' reaction to information about products identified in the images. For example, the user reactions include that the user tags a captured image to remind the user of purchasing a product identified in the image or the user clicks a "Confirm" button to complete purchase of the product. The user profile engine 203 updates a user profile associated with a user based on how the user interacts with a product. For example, the user clicks on a link to a website where the user can purchase the product, views the website with the product and makes a purchase of the product. Accordingly, the user profile engine 203 updates the user profile by storing the click history associated with the website in the user profile, adding the browsing history related to the product to the user profile and recording the purchase of the product in the user profile. In one embodiment, the user profile engine 203 determines a purchase habit for the user based on aggregating and analyzing the user reactions to the products identified in captured images and updates the user profile with the determined purchase habit. For example, in the above example, the user profile engine 203 analyzes the click history, the browsing history and purchase information (e.g., the time between the user capturing the image and clicking on the website to purchase the product, the time that the user spent on the purchase process, etc.), determines a purchase habit for the user and stores the purchase habit in the user profile.

In another embodiment, the user profile engine 203 updates the user profile based on other user interactions. For example, when the types of images that the user captures change as time passes by, the user profile engine 203 may replace a first interest in the user profile with a second interest to reflect this change.

The product engine 205 can be software including routines for identifying products in an image. In one embodiment, the product engine 205 can be a set of instructions executable by the processor 235 to provide the functionality described below for identifying products in an image. In another embodiment, the product engine 205 can be stored in the memory 237 of the computing device 200 and can be accessible and executable by the processor 235. In either embodiment, the product engine 205 can be adapted for cooperation and communication with the processor 235 and other components of the computing device 200 via signal line 226.

The product engine 205 receives a captured image from a user via the processing unit 201 and identifies products in the captured image. For example, the image could be of a woman holding a wine bottle. The product engine 205 identifies the clothing and jewelry the woman is wearing (e.g. the dress is made by a clothing store, the necklace is from a boutique in New York City) and the wine in the wine bottle (e.g. the wine is produced by California winery). The product engine 205 also identifies categories associated with the products. For example, in the above example, the product engine 205 determines that the category for the dress is clothing, the category for the necklace is jewelry and the category for the wine is drink. The product engine 205 further identifies a channel for the captured image. A channel is the distribution method used to send media content including advertisements to a user device 115, for example, a television channel, a streaming video website, a newspaper, a journal, etc. For example, the product engine 205 identifies that the image is captured from a celebrity conversion show broadcasted on a television channel.

In one embodiment, the matching engine 207 identifies the indexed image that matches a captured image from the database included in the data storage 243 and transmits the indexed image to the product engine 205, which identifies a product, a product category and a channel for the indexed image. The matching engine 207 will be described in detail below.

The product engine 205 instructs the user interface engine 213 to generate a user interface to provide the user with information about the products identified in the captured image. In one example, the user interface includes the captured image with an overlay of hotspots on the image that include links to stores where the user could purchase the products depicted in the image, locations of the stores and working hours of the stores. In another example, if the captured image is a smartphone advertisement taken from the television channel, the product engine 205 instructs the user interface engine 213 to provide the user information (e.g., technological specification, launch date, price, retailer, etc.) associated with the smartphone and displays the information on the user device 115.

In one embodiment, the product engine 205 determines actions performed by the users in response to receiving the information about the products. For example, the product engine 205 determines that the user clicks on a link to a website where the user can purchase a product, tracks that the user views the prices and specifications of similar products and records that the user makes a purchase of the product.

The matching engine 207 can be software including routines for identifying an indexed image that matches a captured image. In one embodiment, the matching engine 207 can be a set of instructions executable by the processor 235 to provide the functionality described below for identifying an indexed image that matches a captured image. In another embodiment, the matching engine 207 can be stored in the memory 237 of the computing device 200 and can be accessible and executable by the processor 235. In either embodiment, the matching engine 207 can be adapted for cooperation and communication with the processor 235 and other components of the computing device 200 via signal line 228.

The matching engine 207 receives a captured image from the processing unit 201 and identifies, from the database that stores indexed images, an indexed image that matches the captured image. In one embodiment, the matching engine 207 identifies an indexed image that matches the captured image based on information received from the product engine 205. The information includes a product, a product category and a channel identified for the captured image. For example, the product engine 205 determines that a captured image is from an automobile magazine and identifies that the blue car included in the captured image is a newest model of a car for a German car company. The matching engine 207 identifies indexed images that are from the automobile magazine, selects from the identified images an image that is indexed based on a car having the same brand, the same model and the same color, and determines that the selected image is the indexed image that matches the captured image.

In another embodiment, the matching engine 207 identifies an indexed image that matches the captured image based on metadata associated with images (e.g., a timestamp associated with the captured image in a video). For example, the processing unit 201 identifies that a captured image is from 00:45:28 of a fashion show that airs on a television channel. The matching engine 207 identifies, from the database included in the data storage 243, images of the fashion show that airs on the television channel and selects from the identified images an image at the specific time point 00:45:28 to match the captured image.

In yet another embodiment, the matching engine 207 identifies an indexed image that matches the captured image based on image features. In one embodiment, a feature module (not shown) coupled to the matching engine 207 identifies the features from the images. For example, the matching engine 207 receives an image captured from a movie A. The features identified from the captured image include three objects (e.g., a lady, a cow and a bucket) and background colors (blue on the top and green in the bottom of the image). The matching engine 207 selects indexed images of the movie A from the database based on determining that the source of the image is from the movie A. The matching engine 207 then identifies, from the selected images, that an indexed image has the same objects and consistent background colors with the captured images and determines that the indexed image matches the captured image.

In one embodiment, the matching engine 207 determines whether two images match each other based a threshold criterion. For example, if 85% of features in an indexed image match features in the captured image and the threshold is 80%, the matching engine 207 determines that the indexed image matches the captured image based on the actual match (85%) is greater than the threshold 80%. Those skilled in the art will recognize that other approaches can be used to identify an indexed image that matches to a captured image.

The channel engine 209 can be software including routines for determining which channels are popular. In one embodiment, the channel engine 209 can be a set of instructions executable by the processor 235 to provide the functionality described below for determining which channels are popular. In another embodiment, the channel engine 209 can be stored in the memory 237 of the computing device 200 and can be accessible and executable by the processor 235. In either embodiment, the channel engine 209 can be adapted for cooperation and communication with the processor 235 and other components of the computing device 200 via signal line 230.

The channel engine 209 determines which channels are popular based on information of images captured in each channel. A channel is for sending digital media to a user device 115, for example, a television channel and a streaming video website. A channel can also be for providing print media to a user, for example, newspapers and journals. In one embodiment, the channel sends certain types of media content. For example, the channel can include a movie channel, a news channel, a music magazine, a sports magazine, a financial newspaper, etc. In another embodiment, the channel sends different types of media content. For example, the channel can include a daily newspaper, a video sharing website, etc.

In one embodiment, the channel engine 209 determines which channels are popular based on the number of images captured in each channel over a time period. For example, the channel engine 209 determines that the National Geographic channel is popular because this channel has received the most snapshots for a wildlife tourism related queries in last two weeks as compared to other channels.

In another embodiment, the channel engine 209 determines which channels are popular based on the number of images for a product or a product category captured in each channel over a time period. For example, the channel engine 209 determines that a first channel has received the maximum snapshots for a brand of shoes and that a second channel has received the maximum snapshots for a newly released smartphone in last 10 days.

The channel engine 209 also determines a popularity of a channel at different time frames. In one embodiment, the channel engine 209 determines a popularity of a channel at a time frame based on the number of images captured from the channel during different time frames. For example, since many users watch the news using their smartphone when they commute to work in the morning, the channel engine 209 may receive the maximum screen shots from a mobile news channel and determines that this channel is popular at 7:00-7:30 am. In another embodiment, the channel engine 209 determines popularity of a channel at a time frame based on the number of images for a product or a product category captured from the channel during different time frames. For example, since many kids enjoy their play time after dinner, the channel engine 209 may receive the maximum screen shots for toys from a kid channel and determines that this channel is popular at 7:00-8:00 pm.

The channel engine 209 further determines which channels are popular based on actions performed by users. In one embodiment, the channel engine 209 determines which channels are popular based on the number of purchases for products identified in captured images. For example, the product engine 205 provides users with ten websites where the users can purchase all 100 products identified in images captured from a fashion magazine. The channel engine 209 determines that the third website of the ten websites receives the maximum number of purchases for the identified 100 products. In another embodiment, the channel engine 209 determines which channels are popular based on the number of purchases for a specific product identified in captured images. For example, the product engine 205 provides three websites where users can purchase a rocket model identified in captured images. The channel engine 209 determines that the first website of the three websites receives the maximum number of purchases for this particular rocket model.

In one embodiment, the channel engine 209 identifies a peak time for a channel. The channel is popular within the peak time. For example, the channel engine 209 determines that a sports channel is popular each March during the annual basketball season and identifies that March is a peak time of this channel. In another example, the channel engine 209 determines that peak time of a television channel is 7:00-7:45 pm because images of a coat are mainly captured at 7:00-7:45 pm when a television show is played on the channel.

The advertisement engine 211 can be software including routines for recommending an advertising campaign associated with an image and identifying an advertisement from the advertising campaign for a user. In one embodiment, the advertisement engine 211 can be a set of instructions executable by the processor 235 to provide the functionality described below for recommending an advertising campaign associated with an image and identifying an advertisement from the advertising campaign for a user. In another embodiment, the advertisement engine 211 can be stored in the memory 237 of the computing device 200 and can be accessible and executable by the processor 235. In either embodiment, the advertisement engine 211 can be adapted for cooperation and communication with the processor 235 and other components of the computing device 200 via signal line 232.

The advertisement engine 211 receives an advertising campaign associated with an indexed image from advertisers. The indexed image is stored in the database included in the data storage 243. The advertising campaign includes a set of advertisements. An advertisement can include text, pictures, audio, video, links, maps, etc. For example, if an indexed image is from a situation comedy, an advertising campaign associated with the indexed image may include advertisements for other situation comedies. In one embodiment, the advertising campaign can be associated with products identified from the indexed image. For example, for a diamond necklace identified from an image, the advertisement engine 211 receives an advertising campaign including a picture of earrings that pair with the necklace, a link to the website of the boutique that sells the necklace, pictures of other diamond necklaces sold in the boutique, a map with the boutique in the center, etc.

The channel engine 209 determines which channels are popular based on information of images captured in each channel. The advertisement engine 211 receives information about which channels are popular and recommends an advertising campaign based on popularity of the channels. In one embodiment, the advertising campaign is about a product identified in captured images. For example, if images of a product are captured during certain peak times or purchases are made during peak times, the advertisement engine 211 recommends broadcasting an advertising campaign for the product at that time period. In another embodiment, the advertising campaign is about captured images. For example, if the National Geographic channel has received the maximum snapshots for a wildlife tourism in Africa in the last two weeks, the advertisement engine 211 recommends that the advertiser put in the National Geographic channel a first advertisement of a travel agency that handles trips to Africa and a second advertisement of a famous zoo where people can see wild animals from Africa.

The advertisement engine 211 identifies an advertisement for a user responsive to receiving an image captured from the user. In one embodiment, the advertisement engine 211 receives an advertising campaign associated with an indexed image. The advertising campaign includes a set of advertisements. The channel engine 209 determines which channels are popular. The advertisement engine 211 identifies a channel for each advertisement based on the popularity of the channels.

The processing unit 201 receives a captured image from a user. The matching engine 207 identifies that the indexed image matches the captured image. The product engine 205 identifies a product in the indexed image. The advertisement engine 211 identifies an advertisement from the set of advertisements based on the product and a user profile associated with the user and provides the advertisement to the user on the identified channel. For example, the advertisement engine 211 receives two advertisements associated with an indexed image. The indexed image includes a scooter. The first advertisement is of a toy store in New York City and the second advertisement is of a toy store in San Diego. Both stores sell the scooter. The channel engine 209 determines that a kid channel is popular at 7:00-8:00 pm every night based on receiving the maximum number of captured images of toys from this channel during this peak time. The advertisement engine 211 identifies this channel for providing the first and second advertisements at 7:00-8:00 pm every night. A user captured an image from a magazine. The matching engine 207 identifies that the indexed image matches this captured image and the product engine 205 identifies the scooter in the indexed image. Since the user profile indicates that the user lives in New York City, the advertisement engine 211 identifies the first advertisement from the two advertisements for the user and provides the user with the first advertisement on the kid channel at 7:00-8:00 pm every night.

In one embodiment, the advertisement engine 211 provides advertisers with a recommendation about advertisements prior to receiving the advertisements from the advertisers. For example, the advertisement engine 211 recommends that the advertisers provide an advertisement about a specific brand of juice. In another embodiment, the advertisement engine 211 provides other recommendations based on determining a popularity of a channel. For example, responsive to receiving information that a science channel is popular from the channel engine 209, the advertisement engine 211 recommends that producers provide science programs to broadcasters and publishers publish science books. Based on the information that the maximum numbers of images were captured between 8:00-9:00 pm from the science channel, the advertisement engine 211 recommends when and on which channel that broadcasters play the science programs to users.

The user interface engine 213 is software including routines for generating graphical data for providing user interfaces to users. In one embodiment, the user interface engine 213 is a set of instructions executable by the processor 235 to provide the functionality below for generating graphical data for providing the user interfaces. In another embodiment, the user interface engine 213 is stored in the memory 237 of the computing device 200 and is accessible and executable by the processor 235. In either embodiment, the user interface engine 213 is adapted for cooperation and communication with the processor 235 and other components of the computing device 200 via signal line 234.

In one embodiment, the user interface engine 213 generates a graphical interface for a user of a user device 115 to capture an image from media content displayed on the media player 107 or the print media 109. In another embodiment, the user interface engine 213 receives instructions from the product engine 205 to generate graphical data for presenting information of products on a user device 115 for a user. In yet another embodiment, the user interface engine 213 generates a graphical image for displaying an advertisement about a product identified from a captured image.

Example Methods and Graphic Representations

Figure 3:
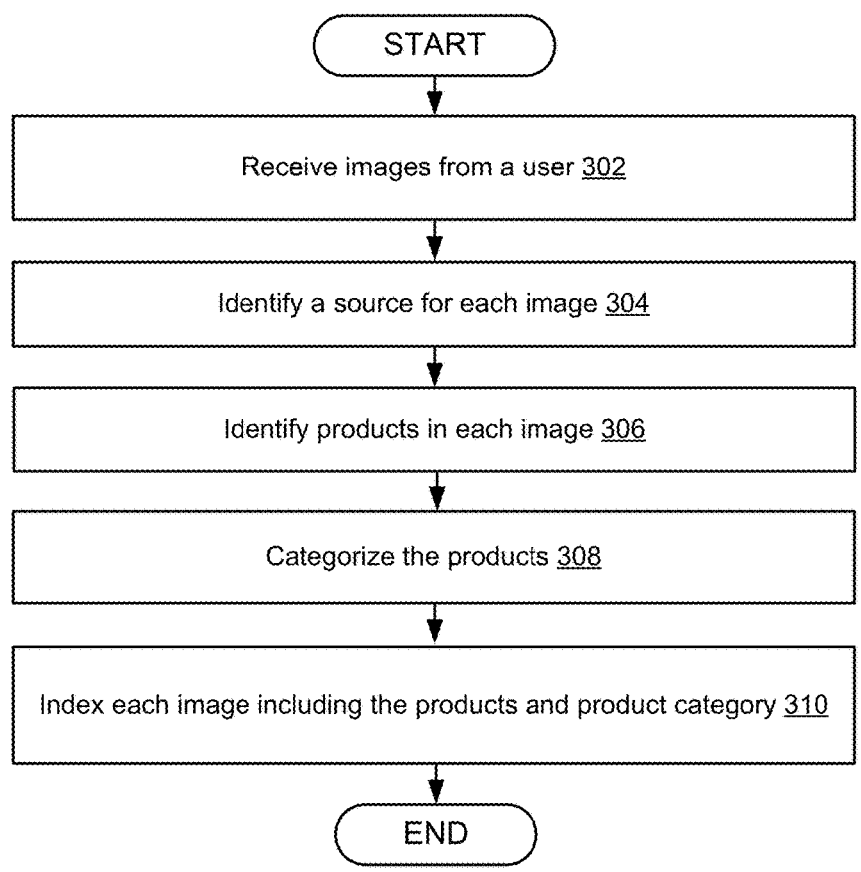
FIG. 3 is a flow diagram illustrating one embodiment of a method for indexing images.

FIG. 3 is a flow diagram 300 of one embodiment of a method for indexing images. The computing device 200 includes the recognition application 103 and data storage 243. The recognition application 103 includes a processing unit 201 and a product engine 205. The data storage 243 includes a database.

The processing unit 201 receives 302 images from a user via the communication unit 241. In one embodiment, the images are from print media such as newspapers, magazines, articles, etc. In another embodiment, the images are from a video (e.g., a situation comedy, a fashion show). The processing unit 201 identifies 304 a source for each image, for example, from a newspaper or from a video. In one embodiment, the processing unit 201 identifies that a source of the image is a video and determines a timestamp associated with the image in the video. The processing unit 201 stores the images and the source in the database included in the data storage 243.

The product engine 205 receives images from the processing unit 201 and identifies 306 products in each image. For example, an image could be of a woman holding a wine bottle. The product engine 205 identifies the clothing and jewelry the woman is wearing (e.g. the dress is made by a clothing store, the necklace is from a boutique in New York City) and the wine in the wine bottle (e.g. the wine is produced by California winery). The processing unit 201 categorizes 308 the products. For example, in the above example, the product engine 205 determines that the category for the dress is clothing, the category for the necklace is jewelry and the category for the wine is drink.

The database indexes 310 each image including product information and product category. For example, the database indexes a mountain bike and a bottle of juice shown in an image. The database also indexes the mountain bike in a "bike" category and indexes the bottle of juice in a "drink" category.

Figure 4:
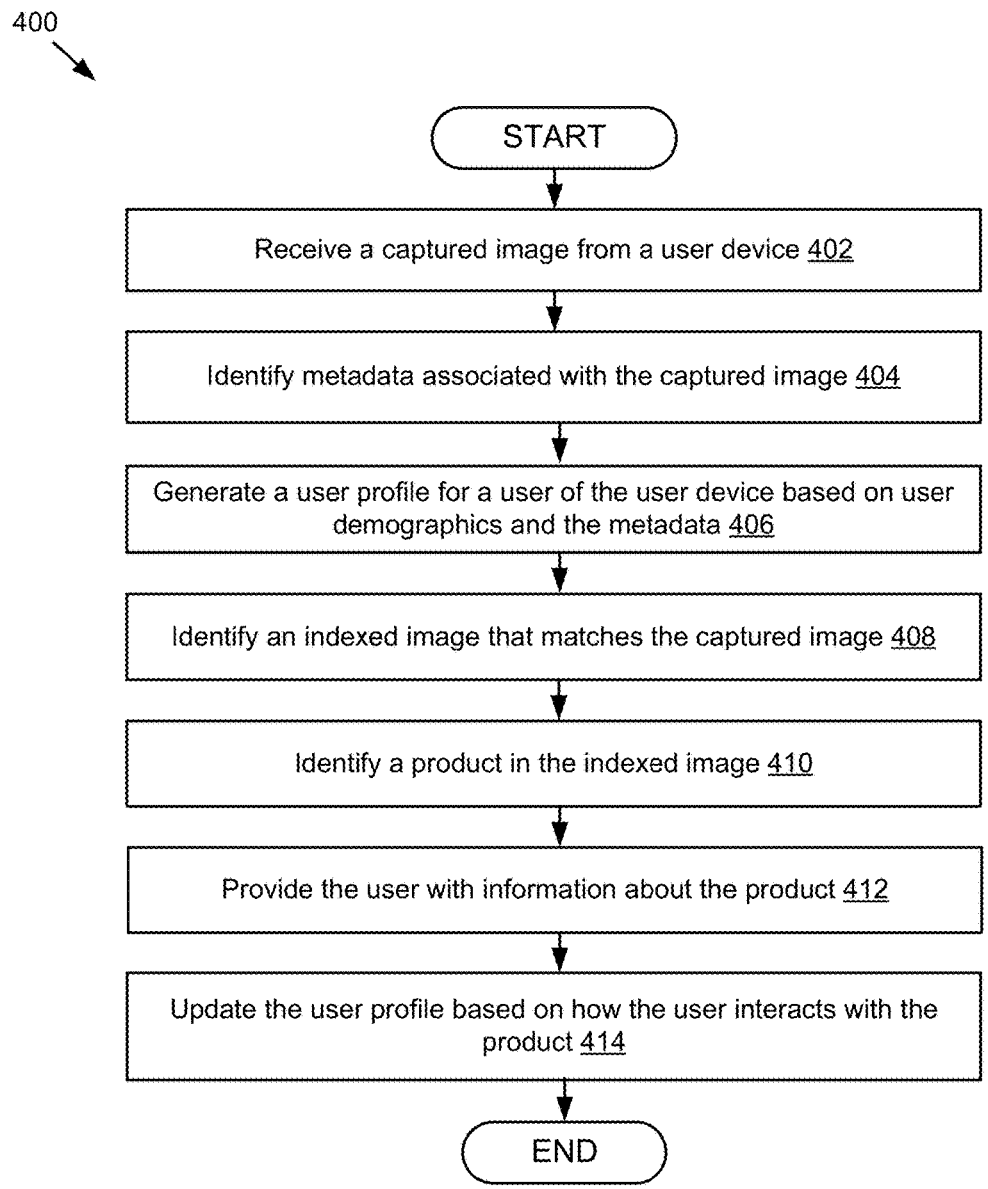
FIG. 4 is a flow diagram illustrating one embodiment of a method for updating a user profile based on user interactions with a product.

FIG. 4 is a flow diagram 400 of one embodiment of a method for updating a user profile based on user interactions with a product. The recognition application 103 includes a processing unit 201, a user profile engine 203, a product engine 205 and a matching engine 207.

The processing unit 201 receives 402 a captured image from a user device. The image is from a video played on the media player 107 or from a document shown in the print player 109. The processing unit 201 identifies 404 metadata associated with the captured image. For example, the processing unit 201 determines the time that the image was captured and the location of the user who captured the image. The processing unit 201 also identifies a source for the captured image.

The user profile engine 203 generates 406 a user profile for a user of the user device 115 based on user demographics and the metadata. For example, the user profile includes user demographics such as age, sex, residence, language, etc. The user profile also includes metadata associated with images captured by the user. For example, the user profile includes that the user captured an image in Salt Lake City at 6:20 pm. In one embodiment, the user profile engine 203 identifies the user who captured the image, the location of the user and the time that the image was captured from metadata associated with the image stored in the user profiles.

The matching engine 207 identifies 408 an indexed image that matches the captured image. In one embodiment, the matching engine 207 identifies an indexed image that matches the captured image based on information received from the product engine 205. The information includes a product, a product category and a channel identified for the captured image. In another embodiment, the matching engine 207 identifies an indexed image that matches the captured image based on metadata associated with images (e.g., a timestamp associated with the captured image in a video). In yet another embodiment, the matching engine 207 identifies an indexed image that matches the captured image based on image features.

The product engine 205 identifies 410 a product in the indexed image and provides 412 the user with information about the product. For example, the product engine 205 instructs the user interface engine 213 to generate a user interface. The user interface includes the captured image with an overlay of hotspots on the image that include links to stores where the user could purchase the products depicted in the image, locations of the stores and working hours of the stores.

The user profile engine 203 updates 414 the user profile based on how the user interacts with the product. For example, the user clicks on a link to a website where the user can purchase the product, views the website with the product and makes a purchase of the product. Accordingly, the user profile engine 203 updates the user profile by storing the click history associated with the website in the user profile, adding the browsing history related to the product to the user profile and recording the purchase of the product in the user profile.

Figure 5A:
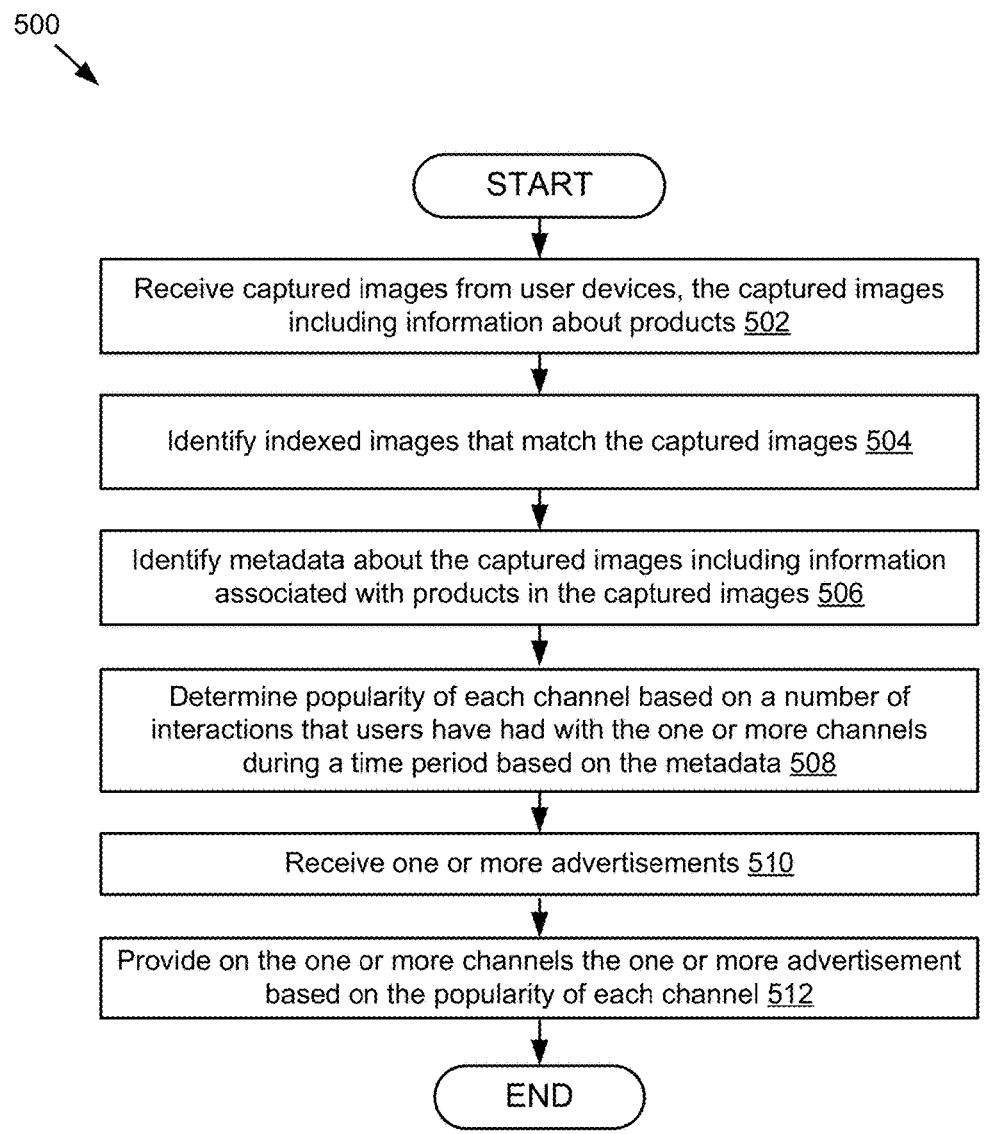
FIG. 5A is a flow diagram illustrating one embodiment of a method for providing an advertisement to a channel based on popularity of each channel.

FIG. 5A is a flow diagram 500 of one embodiment of a method for recommending an advertisement based on user activities. The recognition application 103 includes a processing unit 201, a product engine 205, a matching engine 207, a channel engine 209 and an advertisement engine 211.

The processing unit 201 receives 502 captured images from user devices 115, the captured images including information about products. The captured images can be from video or print media. For example, the captured images are of products in videos, information about how to purchase products in videos, products in magazine articles, etc. The matching engine 207 identifies 504 indexed images that match captured images. The product engine 205 identifies 506 metadata about the captured images including information associated with products in the captured images. The channel engine 209 determines 508 the popularity of each channel based on a number of interactions that users have had with the one or more channels during a time period based on the metadata. The popularity can be determined, for example, based on a number of captures of images from a channel. The popularity can be further analyzed based on a product category. For example, more captured images may be associated with Channel A, but Channel B may be more popular when the category is automobile accessories. This will help advertisers know which channel should display the advertisement and when it should be displayed. The method also helps integrate advertisements across different mediums, such as print or television; makes advertisement rates highly flexible and dynamic based on where and when advertisements are placed; and helps producers and broadcasters decide which show and when to broadcast the show on a digital medium.

The processing unit 201 receives one or more advertisements from a broadcaster or other media company, which the processing unit 201 transmits to the advertising engine. The advertising engine 211 provides one or more channels with the one or more advertisements based on the popularity of each channel. For example, if the advertisement is about automobile accessories, the advertising engine 211 provides the advertisement to Channel B.

Figure 5B:
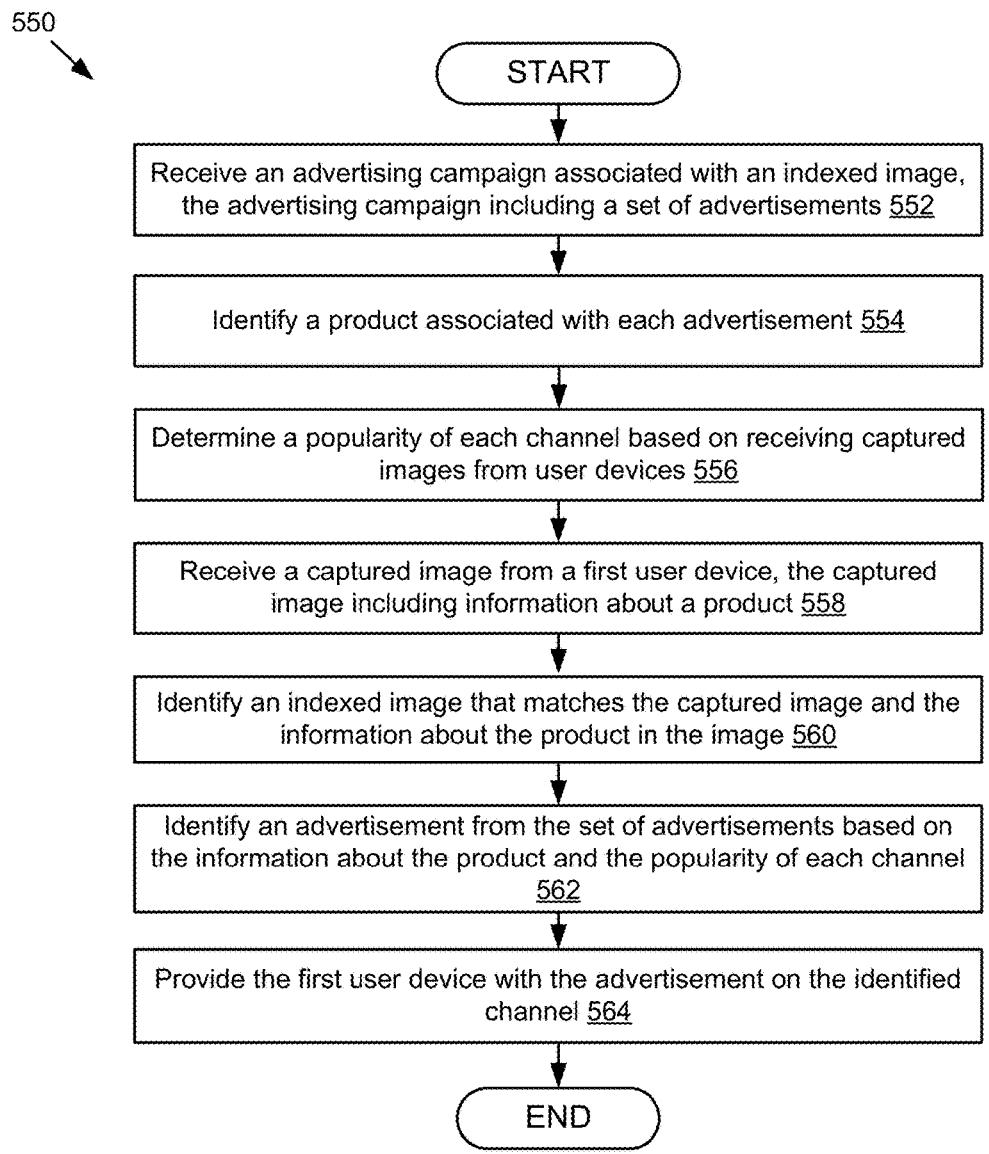
FIG. 5B is a flow diagram illustrating one embodiment of a method for providing the user device with an advertisement based on a user profile and a product.

FIG. 5B is a flow diagram 550 of one embodiment of a method for providing an advertisement based on user activities and a product. In one embodiment, FIG. 5B is written from the perspective of a content provider, such as the broadcaster. The recognition application 103 includes a processing unit 201, a user profile engine 203, a product engine 205, a matching engine 207, a channel engine 209 and an advertisement engine 211.

The advertisement engine 211 receives 552 an advertising campaign associated with an indexed image, the advertising campaign including a set of advertisements. For example, an advertiser sends advertisements for a variety of products organized according to product category. The advertisement engine 211 identifies 554 a product associated with each advertisement. For example, the advertisement engine 211 identifies that a product category for one of the advertisements is fast food. The captured images can be from video or print media.

The channel engine 208 determines 556 a popularity of each channel based on receiving captured images from user devices 115. For example, if images of fast food are captured during certain peak times or purchases are made during peak times, the advertisement engine 211 recommends using advertisements in the advertising campaign that are associated with the same fast food product category at that time period. The channel engine 209 determines which channels are popular, for example, based on the number of images captured in each channel over a time period or based on the number of images for a product or a product category captured in each channel over a time period. In another embodiment, the channel engine 209 also determines a popularity of a channel at different time frames. For example, the channel engine 209 determines a popularity of a channel at an evening time frame based on the number of images captured from the channel from 6-9 pm or based on the number of images for a product or a product category captured from the channel during different time frames. In yet another embodiment, the channel engine 209 determines which channels are popular based on actions performed by users. For example, the channel engine 209 determines which channels are popular based on the number of purchases for products identified in captured images or based on the number of purchases for a specific product identified in captured images.

The processing unit 201 receives 558 a captured image from a first user device, the captured image including information about a product. The matching engine 207 identifies 560 an indexed image matches the captured image and the information about the product in the image. The advertisement engine 211 identifies 562 an advertisement from the set of advertisements based on the information about the product and the popularity of each channel, and provides 512 the first user device with the advertisement on the identified channel. For example, where the user is streaming content on the user device 115, the advertising engine 211 can provide the advertisement that is used in the commercial break section of the streamed content.

In some embodiments, the advertising engine 211 also uses information from a user profile to determine the selected advertisement. For example, if the user has a history of making purchases for a particular product category on the channel in the evening, the advertisement corresponding to that product category. In another example, the user has been capturing images of products related to vacuums from video media and print media, indicating that the user is particularly interested in vacuums at the moment and would be more likely to purchase a vacuum if served an advertisement for one. In one embodiment, the product engine 205 identifies the product in the indexed image. The user profile engine 203 generates the user profile based on user demographics and metadata associated with the captured image including the product. For example, the advertisement engine 211 receives two advertisements associated with an indexed image. The indexed image includes a scooter. The first advertisement is of a toy store in New York City and the second advertisement is of a toy store in San Diego. Both stores sell the scooter. The channel engine 209 determines that a kid channel is popular at 7:00-8:00 pm every night based on receiving the maximum number of captured images of toys from this channel during this peak time. The advertisement engine 211 identifies this channel for providing the first and second advertisements at 7:00-8:00 pm every night. A user captured an image from a magazine. The matching engine 207 identifies that the indexed image matches this captured image and the product engine 205 identifies the scooter in the indexed image. Since the user profile indicates that the user lives in New York City, the advertisement engine 211 identifies the first advertisement from the two advertisements for the user and provides the user with the first advertisement on the kid channel at 7:00-8:00 pm every night.

Figure 6:
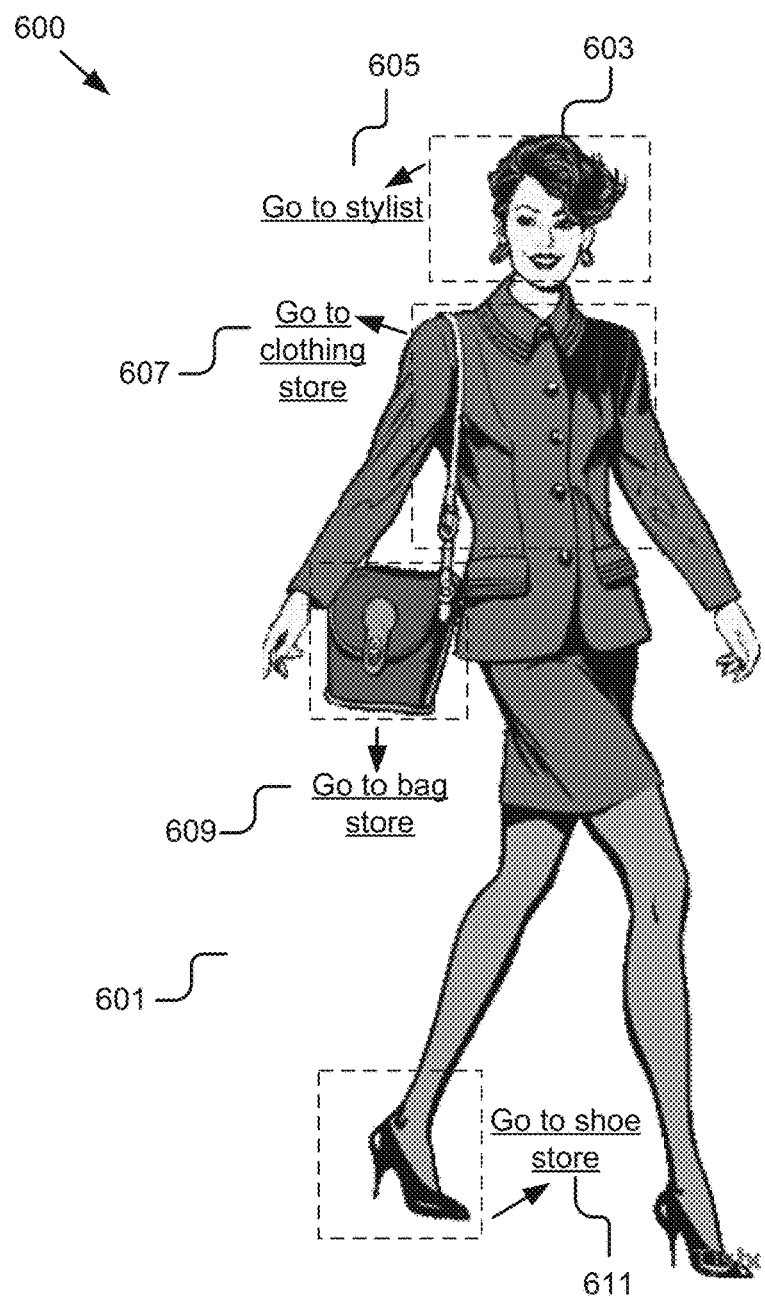
FIG. 6 is a graphical representation of an example display of information associated with identified products on a captured image.

FIG. 6 is a graphical representation 600 of an example display of information associated with identified products on a captured image. In one embodiment, the graphical representation 600 can be displayed on a second screen device, for example, a smartphone associated with the user capturing the image. In this graphic representation 600, the example image is a captured image 601 of an actress wearing fashion accessories. The graphical representation 600 includes a hotspot 603 embedded on the identified products in the captured image 601. The hotspot 603 also includes a text description 605 for identifying the hotspot. Upon clicking the hotspot 603 the user is taken to the web page of the stylist. In the graphical representation 600, the captured image 601 includes a clothing store hotspot 607 embedded on the blouse of the actress, a handbag store hotspot 609 embedded on the handbag of the actress, and a shoe store hotspot 611 embedded on the shoes of the actress.

Figure 7:
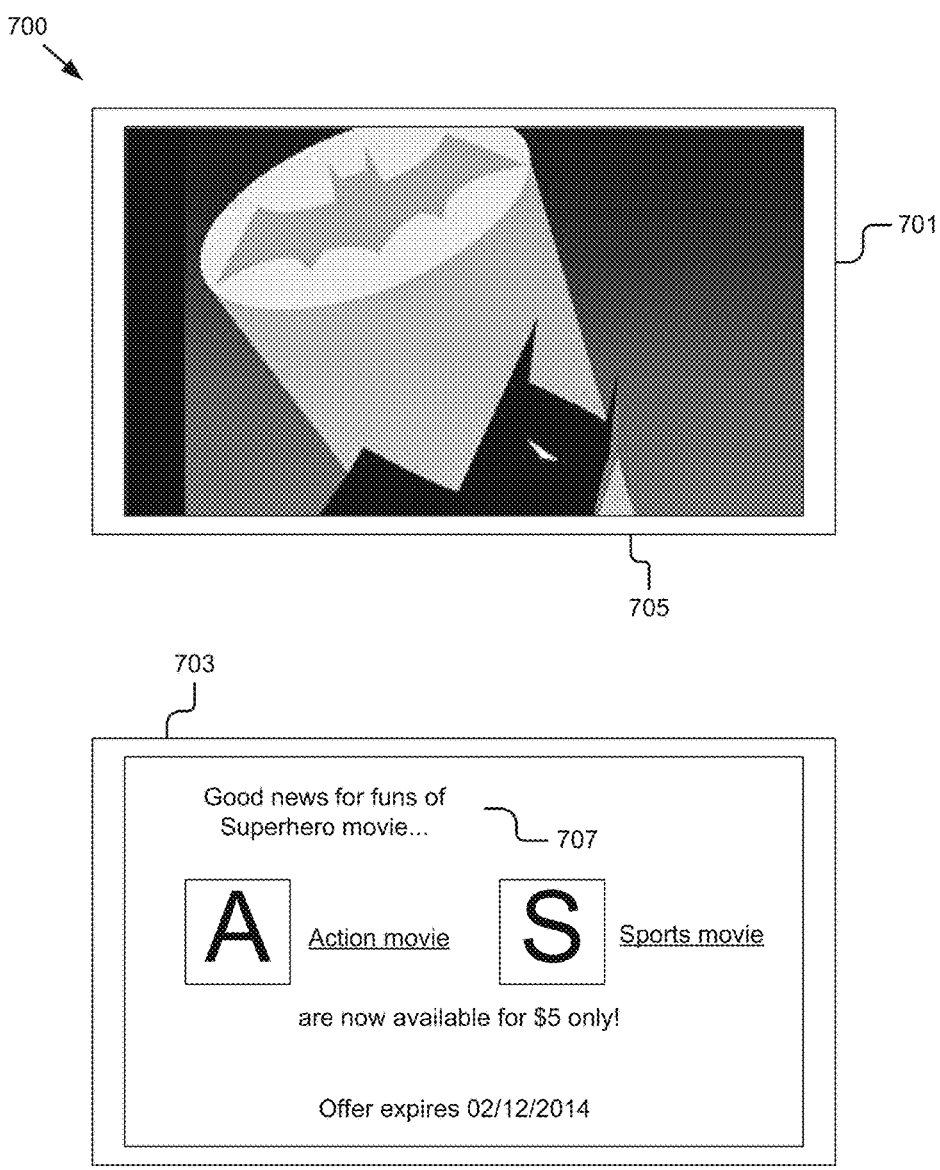
FIG. 7 is a graphical representation of an example advertisement provided to a user based on an image captured by the user.

FIG. 7 is a graphical representation 700 of an example advertisement provided to a user based on an image captured by the user. In the illustrated embodiment, the graphical representation 700 includes a television 701 and a tablet 703. The user watching a super hero movie on the television 701 captures an image of a climactic scene in the movie 705. An advertisement 707 includes an action movie and a sports movie that can be purchased for $5 with the offer expiring on Jan. 12, 2014. The advertisement 707 is determined for the user because the user may like the action movie based on the captured image and the user may like the sports movie based on the user profile associated with the user. An application on the tablet 703 is identified to deliver the advertisement 707 to the user since the maximum number of movie purchases were made from this application in the last one month.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving from a user, with one or more processors, a captured image including a product;
identifying, with the one or more processors, an indexed image that matches the product included in the captured image by identifying features of the product and metadata associated with the captured image, and matching the features of the product and the metadata associated with the captured image to features and metadata of the indexed image stored in a database;

generating a hotspot for the product in the captured image that includes a selectable portion in the captured image, wherein the selectable portion is visually indicated by a bounded region including a textual description identifying the hotspot and is overlaid on the product in the captured image;

displaying information related to the product on a user device for the user to perform a subsequent interaction in response to the user interacting with the hotspot;

receiving user interaction data from a plurality of user devices, the user interaction data describing interactions that users have had with one or more channels over time through the plurality of user devices, the interactions including the user capturing the image, the user interacting with the hotspot, or the user performing the subsequent interaction;

determining, with the one or more processors, popularity of the one or more channels based on the user interaction data including a number of the interactions that the users have had with the one or more channels over time;

identifying, from the one or more channels, a channel and a time frame with which the users have had a maximum number of interactions over time;

identifying, with the one or more processors, one or more advertisements associated with the product based on the indexed image and a location of the user, the location included in the metadata associated with the captured image; and providing, with the one or more processors, the one or more advertisements to the user on the channel at the time frame.

2. The method of claim 1, wherein determining popularity of the one or more channels is based on a number of images captured of each channel over time.

3. The method of claim 1, wherein determining popularity of the one or more channels is based on a number of images for the product or a product category captured of each channel over time.

4. The method of claim 1, wherein determining popularity of the one or more channels is based on a number of purchases for products identified in the captured image.

5. The method of claim 1, further comprising:
receiving images for indexing;
identifying the product from the images for indexing;
determining a product category for the product; and
indexing the images based on the product and the product category.

6. The method of claim 1, further comprising generating a user profile based on user demographics and the metadata associated with the captured image.

7. The method of claim 6, further comprising updating the user profile based on how the user interacts with the captured image.

8. A system comprising:
one or more processors;
a processing unit stored on a memory and executable by the one or more processors, the processing unit configured to receive a captured image from a user, the capture image including a product, and generate a hotspot for the product in the captured image that includes a selectable portion in the captured image, wherein the selectable portion is visually indicated by a bounded region including a textual description identifying the hotspot and is overlaid on the product in the captured image;

a matching engine coupled to the processing unit and configured to identify an indexed image that matches the product included in the captured image by identifying features of the product and metadata associated with the captured image, and matching the features of the product and the metadata associated with the captured image to features and metadata of the indexed image stored in a database;

a channel engine coupled to the processing unit and configured to receive user interaction data from a plurality of user devices, the user interaction data describing interactions that users have had with one or more channels over time through the plurality of user devices, the interactions including the user capturing the image, the user interacting with the hotspot, or the user performing a subsequence interaction, determine popularity of the one or more channels and a time frame based on the user interaction data including a number of the interactions that the users have had with the one or more channels over time, and identify, from the one or more channels, a channel with which the users have had a maximum number of interactions over time;

an advertisement engine coupled to the channel engine and configured to identify one or more advertisements associated with the product based on the indexed image and a location of the user, the location included in the metadata associated with the captured image, and provide the one or more advertisements to the user on the channel at the time frame; and a user interface engine coupled to the processing unit and configured to display information related to the product on a user device for the user to perform the subsequent interaction in response to the user interacting with the hotspot.

9. The system of claim 8, wherein the channel engine is further configured to determine popularity of the one or more channels based on a number of images captured of each channel over time.

10. The system of claim 8, wherein the channel engine is further configured to determine popularity of the one or more channels based on a number of images for the product or a product category captured of each channel over time.

11. The system of claim 8, wherein the channel engine is further configured to determine popularity of the one or more channels based on a number of purchases for products identified in the captured image.

12. The system of claim 8, further comprising:
a product engine coupled to the processing unit and configured to receive images for indexing, identify the product from the images for indexing and determine a product category for the product; and
a database coupled to the processing unit and configured to index the images based on the product and the product category.

13. The system of claim 8, further comprising a user profile engine coupled to the processing unit and configured to generate a user profile based on user demographics and the metadata associated with the captured image.

14. The system of claim 13, wherein the user profile engine is further configured to update the user profile based on how the user interacts with the captured image.

15. A computer program product comprising a non-transitory computer useable medium including a computer readable program, wherein the computer readable program when executed on a computer causes the computer to:
receive a captured image from a user, the captured image including a product;

identify an indexed image that matches the product included in the captured image by identifying features of the product and metadata associated with the captured image, and matching the features of the product and the metadata associated with the captured image to features and metadata of the indexed image stored in a database;

generate a hotspot for the product in the captured image that includes a selectable portion in the captured image, wherein the selectable portion is visually indicated by a bounded region including a textual description identifying the hotspot and is overlaid on the product in the captured image;

display information related to the product on a user device for the user to perform a subsequent interaction in response to the user interacting with the hotspot;

receive user interaction data from a plurality of user devices, the user interaction data describing interactions that users have had with one or more channels over time through the plurality of user devices, the interactions including the user capturing the image, the user interacting with the hotspot, or the user performing the subsequent interaction;

determine popularity of the one or more channels based on the user interaction data including a number of the interactions that the users have had with the one or more channels over time;

identify, from the one or more channels, a channel and a time frame with which the users have had a maximum number of interactions over time;

identify one or more advertisements associated with the product based on the indexed image and a location of the user, the location included in the metadata associated with the captured image; and provide the one or more advertisements to the user on the channel at the time frame.

16. The computer program product of claim 15, wherein the popularity of the one or more channels is determined based on a number of images captured of each channel over time.

17. The computer program product of claim 15, wherein the popularity of the one or more channels is determined based on a number of images for the product or a product category captured of each channel time.

18. The computer program product of claim 15, wherein the popularity of the one or more channels is determined based on a number of purchases for products identified in the captured image.

19. The computer program product of claim 15, wherein the computer readable program when executed on the computer further causes the computer to receive images for indexing, identify the product from the images for indexing, determine a product category for the product and index the images based on the product and the product category.

20. The computer program product of claim 15, wherein the computer readable program when executed on the computer further causes the computer to generate a user profile based on user demographics and the metadata associated with the captured image.

* * * * *